US 9,111,254 B2

(12) United States Patent
Smith et al.

(10) Patent No.: US 9,111,254 B2
(45) Date of Patent: Aug. 18, 2015

(54) SYSTEM AND METHOD TO MANAGE ELECTRONIC DATA RELATED TO A LEGAL MATTER

(75) Inventors: Richard Smith, Milford, CT (US); Jill A. Rubio, Redwood City, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 797 days.

(21) Appl. No.: 12/610,968

(22) Filed: Nov. 2, 2009

(65) Prior Publication Data

US 2011/0106773 A1    May 5, 2011

(51) Int. Cl.
*G06F 7/00* (2006.01)
*G06F 17/30* (2006.01)
*G06Q 10/10* (2012.01)

(52) U.S. Cl.
CPC ............ *G06Q 10/10* (2013.01); *G06F 17/3089* (2013.01); *G06F 17/30867* (2013.01)

(58) Field of Classification Search
CPC .......... G06F 17/3089; G06F 17/30867; G06F 2221/2141; G06F 21/6218
USPC .......................................... 707/694, 783, 784
See application file for complete search history.

(56) References Cited

U.S. PATENT DOCUMENTS

| | | | |
|---|---|---|---|
| 7,107,416 B2 * | 9/2006 | Stuart et al. | 711/159 |
| 7,117,322 B2 * | 10/2006 | Hochberg et al. | 711/160 |
| 2004/0158629 A1 * | 8/2004 | Herbeck et al. | 709/224 |
| 2006/0212402 A1 * | 9/2006 | Lundberg et al. | 705/51 |
| 2006/0230044 A1 | 10/2006 | Utiger | |
| 2006/0271526 A1 * | 11/2006 | Charnock et al. | 707/3 |
| 2006/0282484 A1 | 12/2006 | Stakutis et al. | |
| 2006/0282629 A1 * | 12/2006 | Stuart et al. | 711/159 |
| 2006/0282630 A1 | 12/2006 | Hochberg et al. | |
| 2007/0129960 A1 * | 6/2007 | Farrell, Jr. | 705/1 |
| 2007/0208669 A1 * | 9/2007 | Rivette et al. | 705/59 |
| 2007/0271308 A1 * | 11/2007 | Bentley et al. | 707/200 |
| 2007/0271517 A1 * | 11/2007 | Finkelman et al. | 715/742 |
| 2008/0109448 A1 | 5/2008 | Aboel-Nil et al. | |
| 2008/0120129 A1 * | 5/2008 | Seubert et al. | 705/1 |
| 2008/0201318 A1 * | 8/2008 | McNew | 707/5 |
| 2008/0250013 A1 * | 10/2008 | Gruskin et al. | 707/5 |

(Continued)

OTHER PUBLICATIONS

"PSS Systems: Atlas LCC for Litigation Holds & Evidence Collection Management," Aug. 7, 2008; 3 pages http://www.pss-systems.com/solutions/legal_hold.html.

(Continued)

*Primary Examiner* — Mark E Hershley
(74) *Attorney, Agent, or Firm* — Akerman LLP; Michael K. Dixon; Roy P. Zachariah

(57) ABSTRACT

A method includes receiving input at an online electronic data discovery system from a source device via a private network. The input indicates that data related to a legal matter is to be preserved, and identifies a custodian associated with the data. The method includes automatically accessing a directory via the private network and receiving information from the directory indicating a location of the identified custodian. The method includes sending a preservation notice to the identified custodian when the information received from the directory indicates that the custodian is accessible via the private network. The preservation notice indicates that data related to the legal matter is not to be discarded. The method includes sending the preservation notice to another custodian when the information received from the directory indicates that the identified custodian is not accessible.

20 Claims, 11 Drawing Sheets

(56) References Cited

U.S. PATENT DOCUMENTS

| | | | |
|---|---|---|---|
| 2009/0187797 A1* | 7/2009 | Raynaud-Richard et al. | 714/57 |
| 2009/0254572 A1* | 10/2009 | Redlich et al. | 707/10 |
| 2009/0287685 A1* | 11/2009 | Charnock et al. | 707/5 |
| 2009/0326969 A1* | 12/2009 | Paknad et al. | 705/1 |
| 2010/0070448 A1* | 3/2010 | Omoigui | 706/47 |
| 2010/0250624 A1* | 9/2010 | Mayer et al. | 707/809 |
| 2011/0040600 A1* | 2/2011 | Paknad et al. | 705/9 |
| 2011/0173218 A1* | 7/2011 | Paknad et al. | 707/769 |

OTHER PUBLICATIONS

"PSS Systems: Atlas Software Suite: Legal Hold and Retention Management," Aug. 7, 2008; 3 pages http://www.pss-systems.com/solutions/index.html.

"Autonomy: Zantaz first Comprehensive Legal Hold Solution for Immediate and On-Going Preservation of Relevant Solution for Immediate and On-Going Preservation of Relevant Information on Desktops and Laptops," Aug. 7, 2008; 2 pages http://www.autonomy.com/content/News/Release/2007/1203.en.html.

"PSS Systems and Kazeon Partner to Provide Unified Proactive and Reactive eDiscovery Infrastructure," Mountain View, California, Oct. 22, 2007, 2 pages http://www.pss-systems.com/news/071022.html.

"Legal Hold Notification Management—A Powerful, Unique and Cost Effective Solution for Legal Hold Lifecycle Management," Oct. 27, 2008; 2 pages http://www.zantaz.com/products/legal-hold/notifications-management/index.htm.

"Legal Hold Aungate Preservation and Collection Management—The World's 1st Automated Preservation and Collection Solution to Span Enterprise Network Servers as well as Custodian PCs," Oct. 27, 2008; 2 pages http://www.zantaz.com/products/legal-hold/preservation-collection/index.htm.

"Zantaz Legal Hold, Resources—Networking & Storage, introduction of 'Desktop Legal Hold,'" Article—Law Technology News, Jan. 2008; p. 22.

* cited by examiner

SYSTEM AND METHOD TO MANAGE ELECTRONIC DATA RELATED TO A LEGAL MATTER

FIELD OF THE DISCLOSURE

The present disclosure generally relates to communications networks, and more particularly relates to systems and methods to manage electronic data related to a legal matter.

BACKGROUND

Litigation can impose a large burden on a company. In particular, complying with discovery requests can require a company to produce large volumes of documents. Failing to comply with such requests can carry significant legal and financial penalties for the company and for professionals within the company.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods and computer-readable media. Moreover, some statements may apply to some inventive features but not to others.

Figure 1:
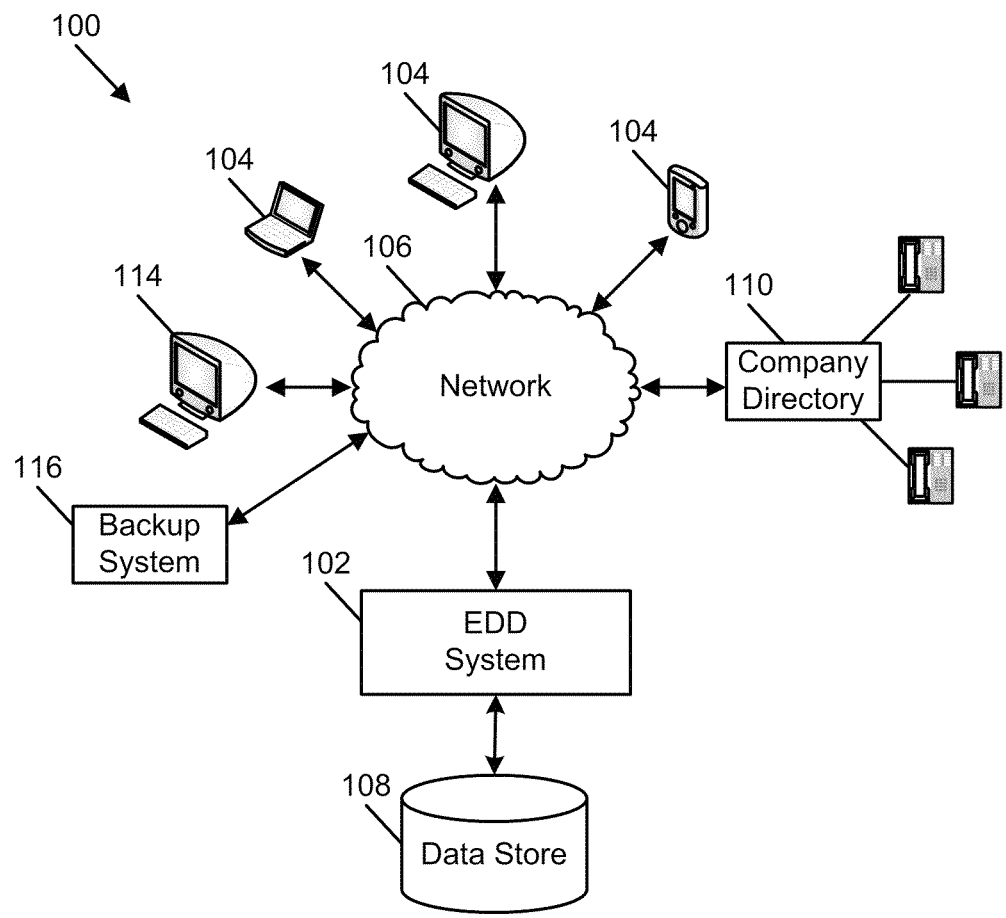
FIG. 1 is a block diagram illustrating a particular embodiment of a system to manage electronic data related to a legal matter.

FIG. 1 illustrates a particular embodiment of a system 100 to manage electronic data related to a legal matter. The system 100 includes an electronic data discovery (EDD) system 102 that communicates with a source device 104 via a network 106. The EDD system 102 can also communicate with a data store 108, such as an enterprise vault or other data storage system. Further, the EDD system 102 can communicate with a company directory 110 that can store information related to an organization, such as names, titles, phone numbers, locations, hierarchies, other information, or any combination thereof, related to employees within the organization.

The EDD system 102 can include an online request system adapted to receive requests form users, such as new case requests, requests for preservation notices, release requests, other requests, or any combination thereof. The EDD system 102 can also include tools corresponding to computer-implemented processes to implement and fulfill such requests. The source device 104 can include a computing device, such as a personal computer, a laptop, or a portable computing device such as a personal data assistant or cellular phone. The network 106 can include a private network, such as a local area network. In another embodiment, the network can include a wide area network.

In a particular, illustrative embodiment, the EDD system 102 can be adapted to send an EDD graphical user interface (GUI) to the source device 104 via the network 106. Alternatively, a client program running at the source device 104 can provide the GUI. The EDD system 102 can be adapted to receive a new case request from the source device 104. The EDD system 102 can be adapted to receive various kinds of input with or subsequent to the new case request.

For example, the EDD system 102 can be adapted to receive input with a new case request identifying a particular legal matter and indicating that data related to a particular legal matter is to be preserved. Such data can include electronic data stored at a custodian device 114, such as a desktop file or email in an active inbox; electronic data stored at a shared drive; electronic data stored at a backup system 116, such as a backup server or backup tape system; electronic data stored at another location; hard copy data; other non-electronic data; or any combination thereof.

The EDD system 102 can also be adapted to receive input identifying a custodian, such as an attorney, an information technology professional, an employee, a supervisor, another person, or any combination thereof, who has access or may have access to a portion of the data that is to be preserved. In another embodiment, the EDD system 102 can automatically identify the custodian based, for example, on the data that is to be preserved. The custodian can be identified by name, job function, another identifier, or any combination thereof.

In a particular embodiment, the input received with the new case request can also include preservation criteria (such as types of data, origins of communications, subjects of documents, or other criteria to identify data that is to be preserved) production criteria (such as a date, legal filing or other event that is to trigger production of preserved data), release criteria (such as a statute of limitations date or other date or event that is to trigger a release of preserved data), or any combination thereof.

Further, the EDD system 102 can be adapted to receive additional input subsequent to a new case request. For instance, the EDD system 102 can receive additional input indicating a change to a parameter of the new case, wherein the change includes a change of the identified custodian, an additional custodian, a change of a preservation criterion, a change of a production criterion, a change of a release criterion, a change of a production date, a change of a release date, another change, or any combination thereof.

The EDD system 102 can be adapted to perform certain acts after receiving input identifying a custodian. For instance, the EDD system 102 can be adapted to access a company directory for the company associated with the legal matter, such as the directory 110 associated with a phone system. The EDD system 102 can be adapted to determine whether another custodian is to be selected based on information in the company directory 110. For instance, the EDD system 102 can be adapted to determine from the company directory 110 whether the identified custodian has left the company, has changed job functions, has changed contact information, is otherwise not accessible, or any combination thereof. If the EDD system 102 determines that another custodian is to be selected, the EDD system 102 can be adapted to prompt the source device 104 and receive a selection of another custodian from the source device 104. Alternatively, the EDD system 102 can be adapted to automatically select or suggest another custodian based on information in the company directory 110 or another directory, based on other information, based on a rules engine, or any combination thereof.

For instance, if the EDD system 102 determines that the identified custodian is no longer accessible via a company network (such as because the identified custodian has left the company), the EDD system 102 can be adapted to automatically notify the source device 104 that the identified custodian's status has changed. The EDD system 102 can be adapted to send a prompt to the source device 104 for a selection of another custodian and to receive input deleting the identified custodian, input identifying another custodian, other input responsive to the prompt, or any combination thereof.

In another example, the EDD system 102 can be adapted to select a supervisor or replacement of the identified custodian automatically, based on information in the company directory, the job function of the identified custodian, another factor, a custodian selection rule, or any combination thereof. Where the EDD system 102 automatically selects the other custodian, the EDD system 102 can prompt the source device 104 for an approval of the other custodian before storing information related to the other custodian or taking an action, such as sending a preservation notice.

After the EDD system 102 receives a new case request and input identifying a custodian, the EDD system 102 can be adapted to determine whether it is to send a preservation notice to the identified custodian or another custodian. If so, the EDD system 102 can be adapted to format and send the preservation notice to the identified custodian or other custodian. The preservation notice can indicate, for example, that data related to the legal matter is not to be deleted from an electronic file or otherwise discarded. The preservation notice can identify certain data in the possession of any custodian, can list preservation criteria for the custodian to follow, can include other information related to preservation of data, can prompt the custodian for a confirmation that the preservation notice has been received, or any combination thereof. In a particular embodiment, the EDD system 102 can be adapted to determine whether a confirmation of the preservation notice has been received at the EDD system 102 or at the source device 104 from the recipient of the preservation notice, and to send a reminder periodically until the confirmation is received. A frequency with which a reminder is sent can be set by the source device 104. The EDD system 102 can be adapted to store the preservation notice, a submission date of the preservation notice, a closing date of the preservation notice, or any combination thereof at the data store 108.

In a particular embodiment, the preservation notice can include information indicating that the preservation notice is not to be forwarded. The EDD system 102 can receive a message from the identified custodian or other custodian indicating that an additional custodian should receive the preservation notice. The EDD system 102 can automatically send a similar preservation notice to the additional custodian, or the EDD system 102 can obtain approval from a user at the source device 104 or another device before sending the similar preservation notice to the additional custodian.

The EDD system 102 can be adapted to receive search criteria to be applied to electronic data in possession of the identified custodian or other custodian and collect a portion of the electronic data based on the search criteria. The search criteria can be the same as, or different from, preservation criteria. Search criteria could include, for example, "all PDF documents in the possession of the custodian created or modified between January 2009 and March 2009 including the word 'coffee.'" The EDD system 102 can be adapted to collect all electronic data matching the search criteria and to store the collected data at the data store 108, for example.

In order to collect preserved electronic data, the EDD system 102 can be adapted to search a custodian desktop, a shared drive, a local drive, an external storage drive, a database, or other source to collect electronic data related to the legal matter. The EDD system 102 can be adapted to move collected electronic data to a secure retention location, such as the data store 108, a dedicated server or other location. The EDD system 102 can be adapted to execute a recurring search of the backup system 116, the custodian device 114, or any combination thereof, for additional electronic data related to the legal matter that is stored after the previous collection.

In another example, the EDD system 102 can be adapted to determine whether data for the legal matter has already been preserved by the identified custodian or other custodian. For instance, electronic data may have previously been collected and preserved in conjunction with a different legal matter. If the electronic data has already been preserved, the EDD system 102 can be adapted to locate the preserved electronic data at the data store 108, for example.

In an illustrative, non-limiting embodiment, the EDD system 102 can be adapted to cull data from the collected electronic data according to culling criteria received from the source device 104. The EDD system 102 can be adapted to also collect electronic data from other sources, such as the data store 108, the backup system 116, or any combination thereof. Culling criteria might include, for example, electronic data included in the collected electronic data that includes a certain personal or business name.

In addition, the EDD system 102 can be adapted to determine whether data related to a legal matter is to be produced or exported. For example, the EDD system 102 can be adapted to receive input indicating that a date, legal filing, or other production criterion included in input related to the legal matter is satisfied. If so, the EDD system 102 can be adapted to perform functions related to producing and exporting data related to the legal matter. For example, the EDD system 102 can be adapted to determine whether it has received a request to review electronic data related to the legal matter online before exporting the electronic data. If so, the EDD system 102 can be adapted to set up user access to the electronic data by, for example, creating a security token, an access level, other information associated with a user, or any combination thereof. The EDD system 102 can be adapted to receive input from the user indicating which of the electronic data is responsive to, for example, a discovery request, and should be exported for production. The EDD system 102 can be adapted to mark responsive electronic data.

Further, the EDD system 102 can be adapted to format and export data that is to be produced. In an example, the EDD system 102 can be adapted to obtain the electronic data from a secure retention location, such as the data store 108 The EDD system 102 can be adapted to format data that it obtains automatically according to a rule or other input obtained from the source device or according to a command received from a user who has authorization to indicate a format for production of the electronic data. The EDD system 102 can export data, for instance, by sending it to a printer, a file server, an external storage device, or any combination thereof.

The EDD system 102 can also be adapted to determine whether data related to a legal matter is to be released. For instance, the EDD system 102 can be adapted to receive input indicating that data is to be released, or the EDD system 102 can be adapted to determine that a release date or other event included in the input with the new case request has occurred. The EDD system 102 can be adapted to determine whether a release related to the data has been confirmed and, if not, to remove or reset a release date associated with the data.

If a release is confirmed, the EDD system 102 can be adapted to determine whether data that is to be released for the legal matter is associated with another legal matter for which data has not been released. If not, a release notification can be sent to each recipient of a preservation notice related to the released data. Additionally, the EDD system 102 can be adapted to determine whether it or the data store 108 is storing any of the released electronic data and to delete the data.

When closing a legal matter, the EDD system 102 can be adapted to send a prompt to the source device to confirm that the legal matter has ended and to receive a confirmation from the source device. In an illustrative embodiment, the EDD system 102 can be adapted to send a feedback survey to the source device and can close the case file associated with the legal matter.

Figure 2:
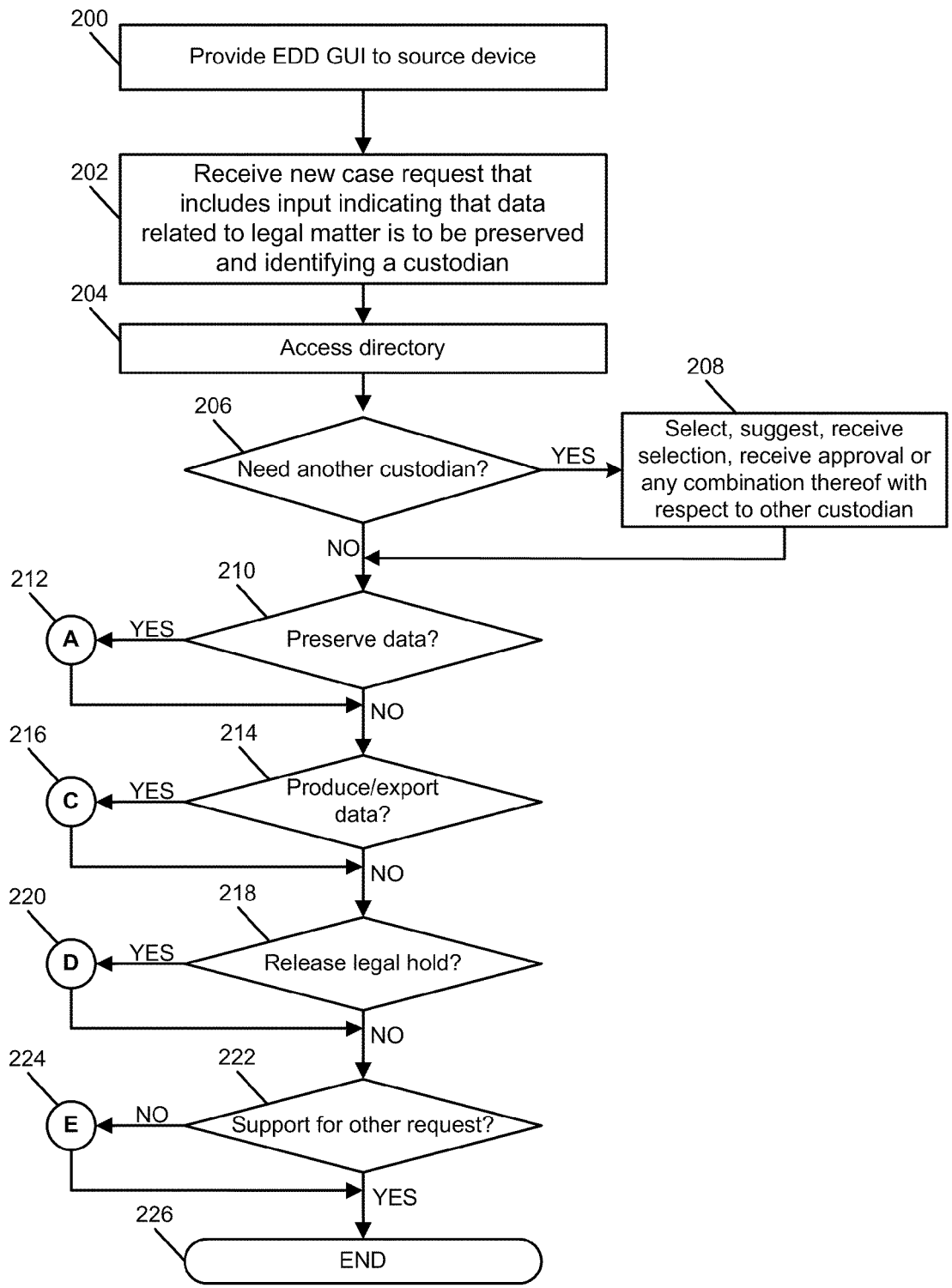
FIGS. 2-7 include flow diagrams illustrating a particular embodiment of a method of managing electronic data related to a legal matter.
Figure 8:
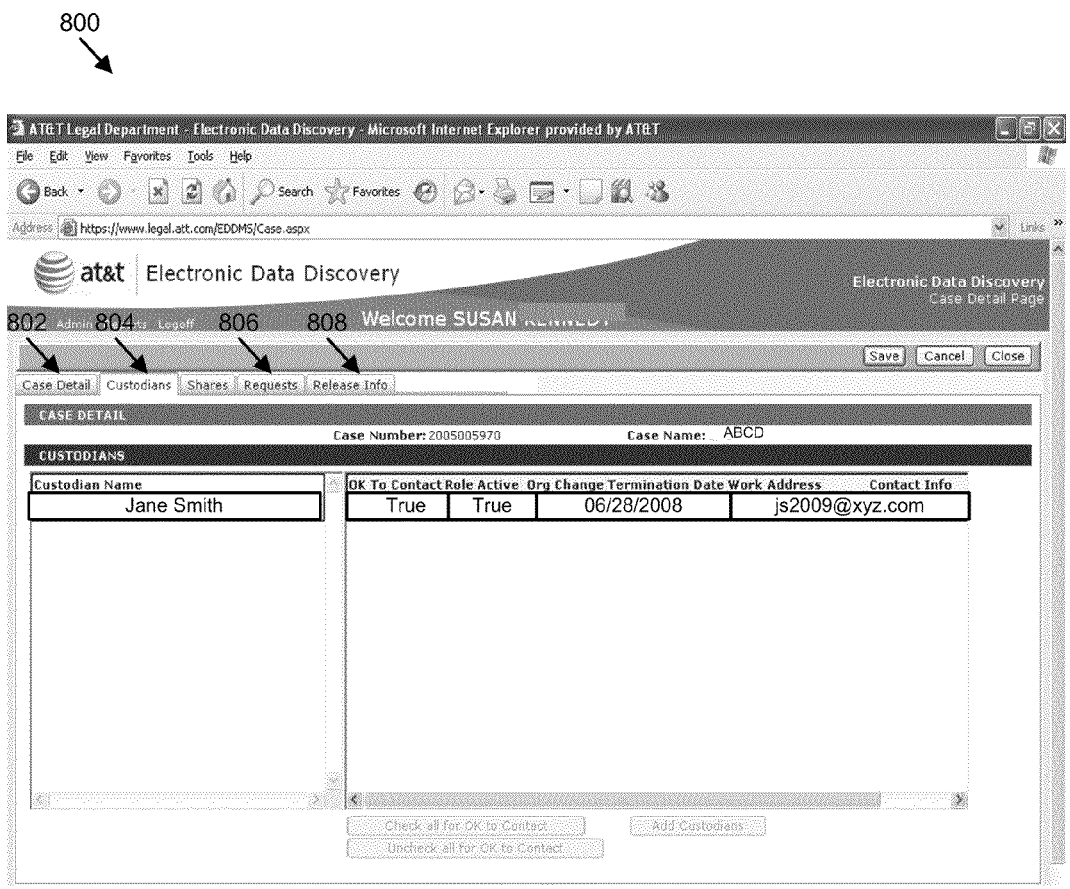
FIGS. 8-10 illustrate example embodiments of portions of an EDD GUI.
Figure 9:
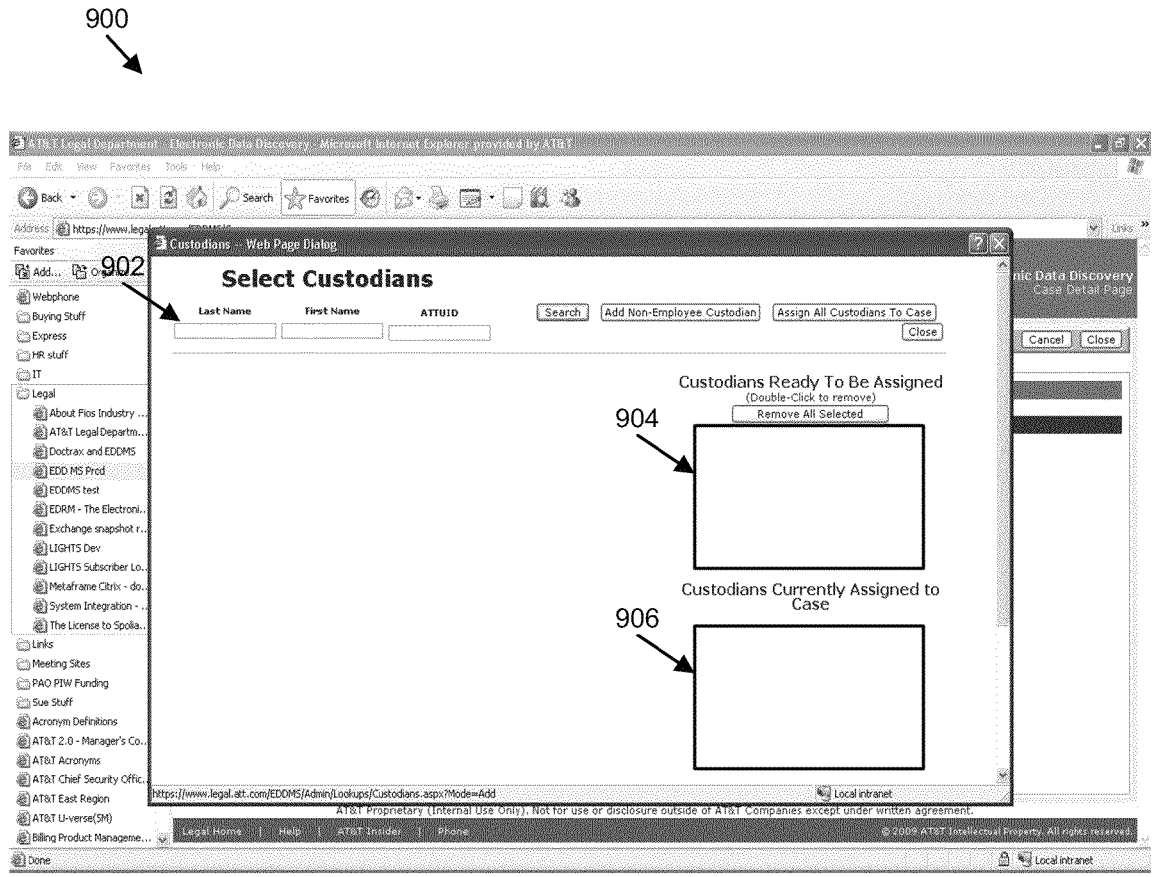
Figure 10:
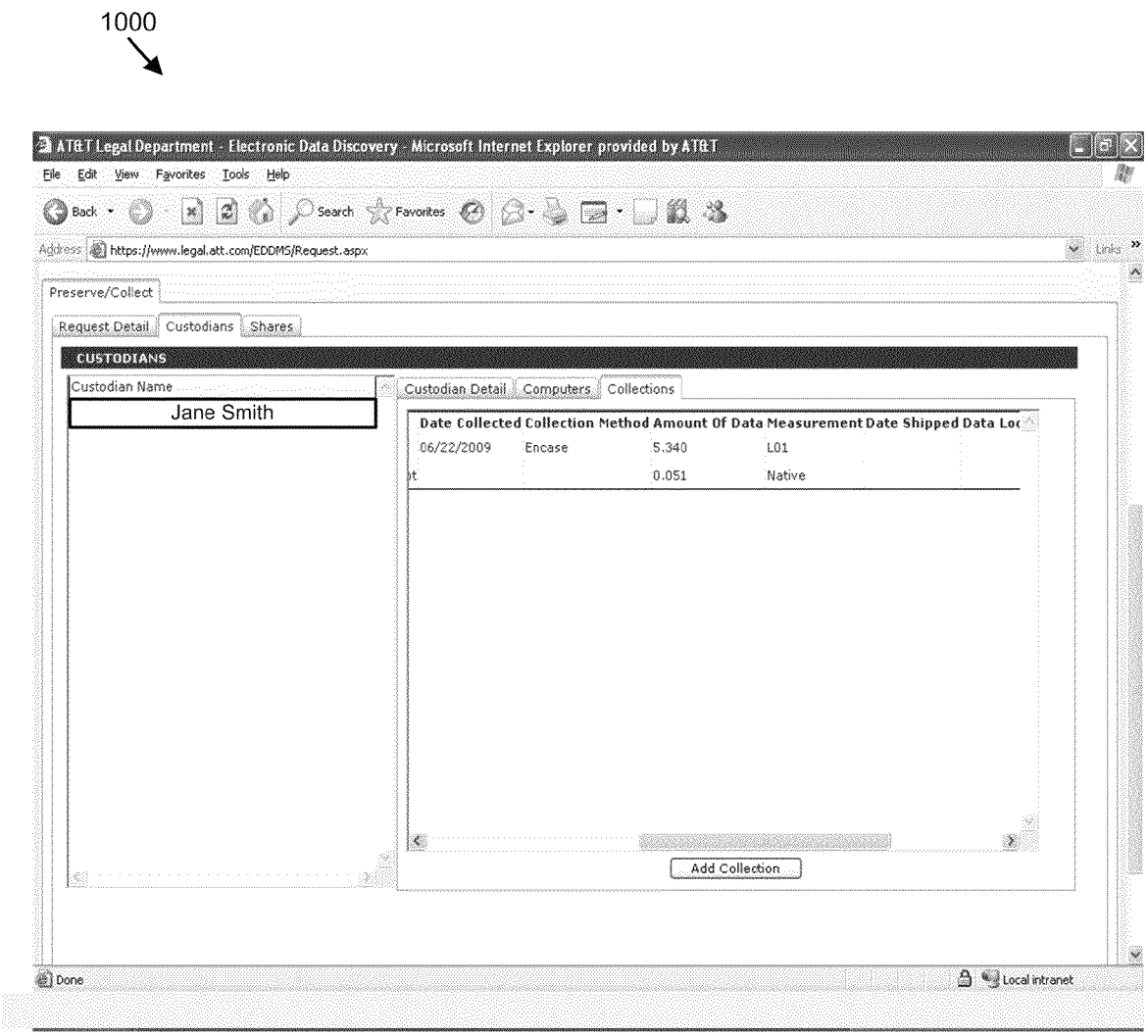

FIG. 2 illustrates a particular embodiment of a method of managing electronic data related to a legal matter. At block 200, an electronic data discovery (EDD) system can send an EDD graphical user interface (GUI) to a source device, such as a computing device used by an attorney or another user. Example portions of an EDD GUI is illustrated in FIGS. 8-10. Moving to block 202, the EDD system can receive a new case request from the source device. The new case request can include input indicating that data related to a legal matter is to be preserved. Such data can include electronic data, non-electronic data, or any combination thereof. The input can also identify a custodian, such as an attorney, information technology professional, employee, supervisor, other person, or any combination thereof, who has access to a portion of the data that is to be preserved. The custodian can be identified by name, job function, another identifier, or any combination thereof. In an example, the identified custodian can include an employee, a subordinate of the employee, a supervisor of the employee, or any combination thereof. In a particular embodiment, the input can also include preservation criteria, production criteria, release criteria, or any combination thereof. The EDD system can set up a new case file and store, or provide access to, information related to the legal matter in conjunction with the new case file.

Proceeding to block 204, the EDD system can access a company directory for the company associated with the legal matter, such as a directory accessible to a company phone system. Continuing to decision node 206, the EDD system can determine whether another custodian is to be selected. For instance, the EDD system can determine from the directory whether the identified custodian has left the company, has changed job functions, has changed contact information, has otherwise changed status, or any combination thereof. If the EDD system determines that another custodian is to be selected, the method advances to block 208, and the EDD system can receive a selection of the other custodian from the source device. Alternatively, the EDD system can automatically select or suggest the other custodian based on information in the company directory, other information, a rules engine, or any combination thereof.

For instance, if the EDD system determines at decision node 206 that the identified custodian is no longer accessible via a company network (such as where the identified custodian has left the company), the EDD system can send a prompt to the source device for a selection of another custodian. In another example, the EDD system can select or suggest a supervisor or replacement of the identified custodian automatically, based on information in the company directory, the job function of the identified custodian, another factor, a custodian selection or suggestion rule, or any combination thereof. In a particular embodiment, the EDD system can also prompt the source device for approval of a selected or suggested custodian.

At decision node 210, the EDD system can determine whether data related to a legal matter is to be preserved. For instance, the EDD system can receive input indicating that a date, legal filing, preservation command, or other preservation criterion included in input related to the legal matter has occurred. If so, the method can move to 212, and the particular embodiment of the method illustrated in FIG. 3. Otherwise, the method can proceed to decision node 214, and the EDD system can determine whether data related to a legal matter is to be produced or exported. For example, the EDD system can receive input indicating that a date, legal filing, production command, or other production criterion has occurred. If so, the method can move to 216, and the particular embodiment of the method illustrated in FIG. 5.

If the EDD system determines that data related to a legal matter is not to be produced or exported, the method continues to decision node 218, and the EDD system can determine whether data related to a legal matter is to be released. For instance, the EDD system can receive a command indicating that the data is to be released. If the EDD system determines that data is to be released, the method can advance to 220, and the particular embodiment of the method illustrated in FIG. 6.

If the EDD system determines that data related to a legal matter is not to be released, the method can move to decision node 222, and the EDD system can determine whether to close a case related to a legal matter. If so, the method can move to 224 and the particular embodiment of the method illustrated in FIG. 7. Otherwise, the method ends at 226.

Figure 3:
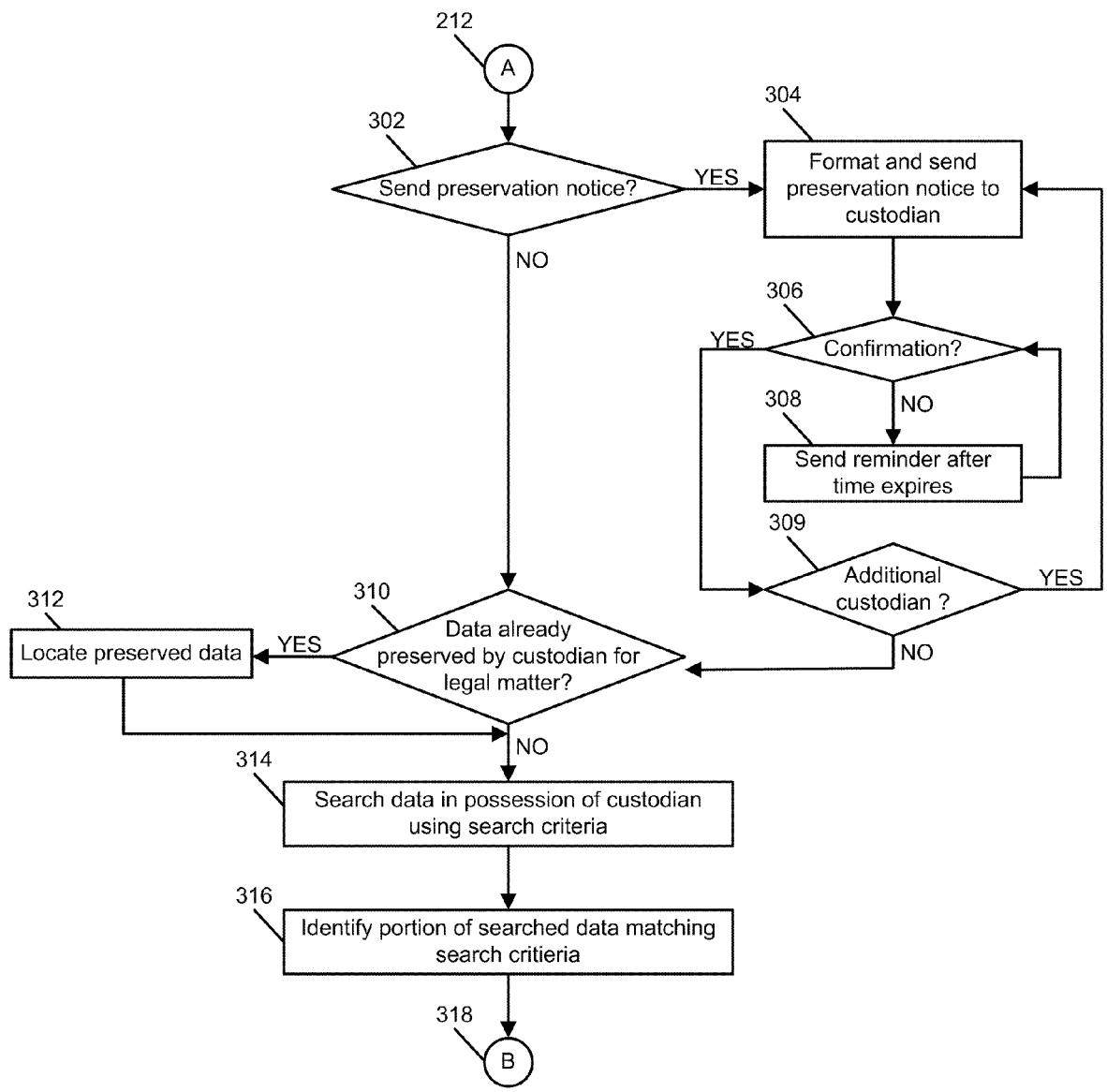

FIG. 3 continues from 212, illustrated in FIG. 2, and includes functions associated with preserving data related to a legal matter. At decision node 302, the EDD system can determine whether it is required to send a preservation notice to a custodian associated with data related to the legal matter. If not, the method moves to decision node 310. Otherwise, the method can move to block 304, and the EDD system can format and send the preservation notice to the custodian. Proceeding to decision node 306, the EDD system can determine whether a confirmation of the preservation notice has been received at the EDD system or the source device. If not, the EDD system can send a reminder to the custodian when a time expires at block 308. Once a confirmation is received, the method can advance to decision node 309.

At decision node 309, the EDD system can determine whether it has received a message from the identified custodian or other custodian indicating that an additional custodian should receive the preservation notice. If so, the method can return to block 304, and the EDD system 102 can send a similar preservation notice to the additional custodian after approval is received from the source device. If not additional custodian is indicated, the method advances to decision node 310.

At decision node 310, the EDD system can determine whether electronic data for the legal matter has already been preserved by the custodian. For instance, the electronic data may have previously been preserved in conjunction with a different legal matter. If not, the method moves to block 314. Otherwise, if the electronic data has already been preserved, the method can move to block 312, and the EDD system can locate the electronic data, for example, at a data store.

Proceeding to block 314, the EDD system can use search criteria to search electronic data in the custodian's possession for electronic data that is to be collected for the legal matter. Continuing to block 316, the EDD system can identify a portion of the preserved electronic data matching the search criteria. The method can advance to 318, and the particular embodiment of collecting electronic data illustrated in FIG. 4.

Figure 4:
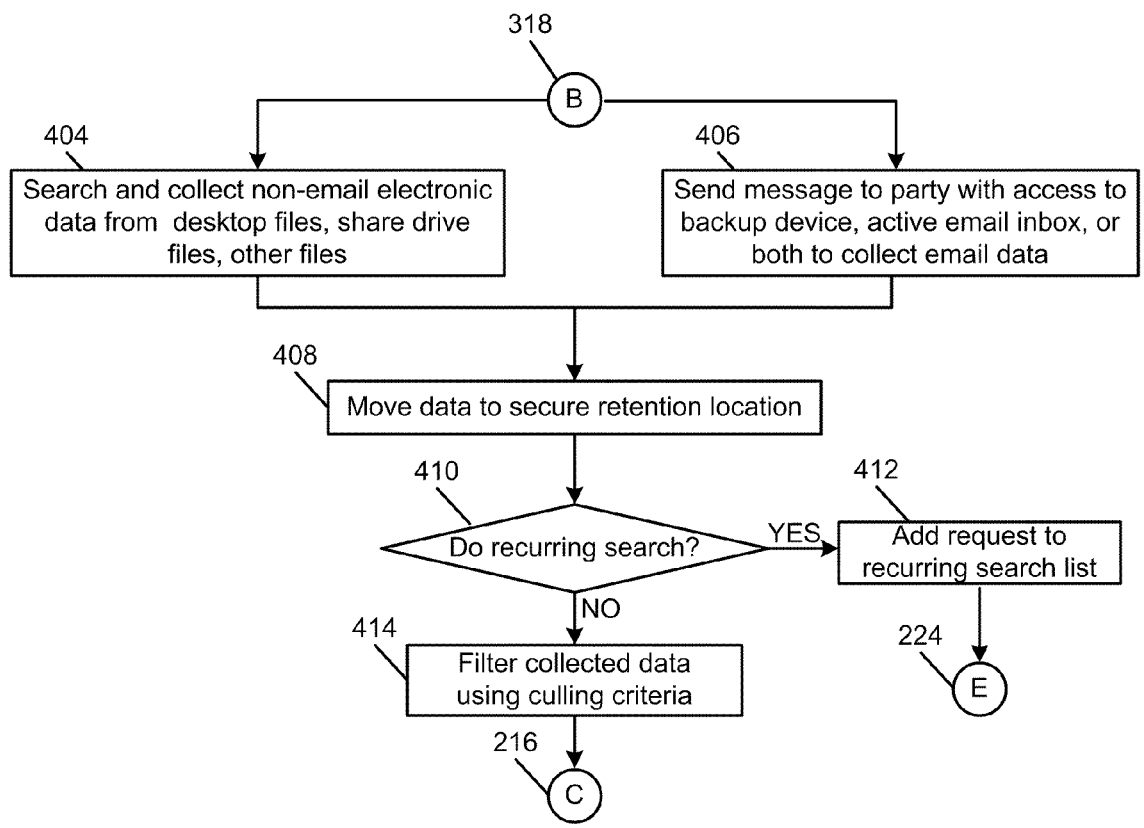

FIG. 4 continues from 318, illustrated in FIG. 3, and includes functions associated with collecting data related to a legal matter. At decision node 404, the EDD system can search a custodian desktop, a share drive, or other source to collect non-email electronic data related to the legal matter. Additionally, at block 406, the EDD system can collect email data related to the legal matter. For instance, the EDD system can search a backup device, such as a server backup, a backup data tape, other backup device, or any combination thereof. Additionally, the EDD system can search email stored in an active email inbox of a custodian, other party or any combination thereof.

Moving to block 408, the EDD system can move electronic data collected at block 404, block 406, or any combination thereof, to a secure retention location, such as a dedicated server or other location. Proceeding to decision node 410, the EDD system can determine whether to execute a recurring search of the backup device, the active email inbox, or any combination thereof, for additional electronic data related to the legal matter. If so, the method can continue to block 412, and a recurring search request can be added to a schedule. At block 414, in a particular embodiment, the EDD system can use culling criteria to filter collected data. The method can then advance to 224, illustrated in FIG. 2, and continue to the particular embodiment of the method illustrated in FIG. 7. If a recurring search is not to be scheduled at decision node 410, the method can advance to 216, illustrated in FIG. 2, and continue to the particular embodiment of the method illustrated in FIG. 5.

Figure 5:
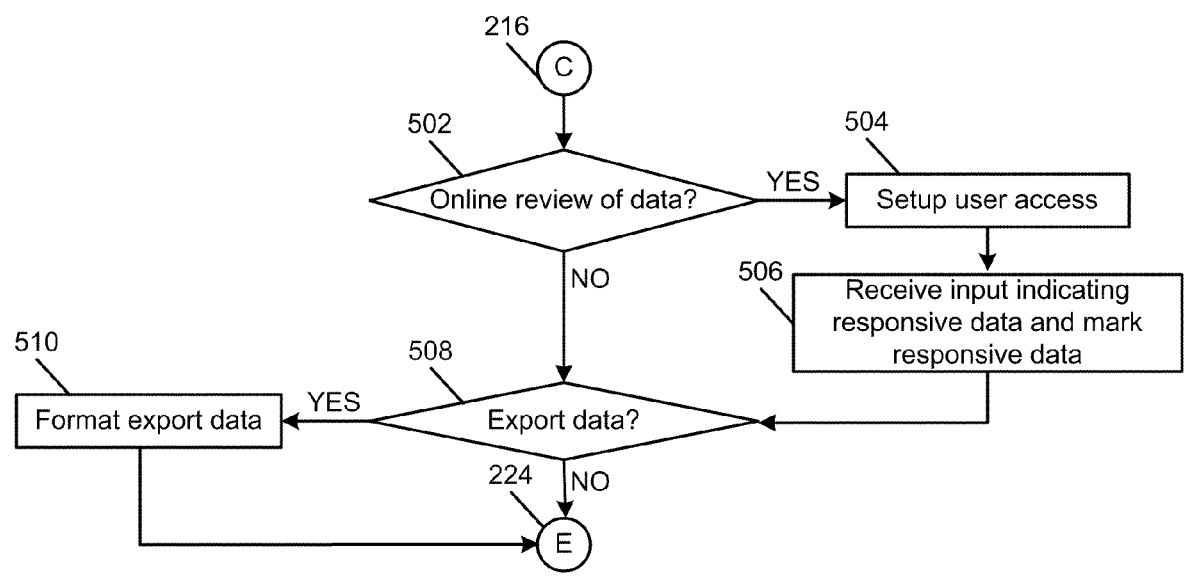

FIG. 5 continues from 216, illustrated in FIG. 2, and includes functions associated with producing data related to a legal matter. At decision node 502, the EDD system can determine whether it has received a request to review electronic data related to the legal matter online before exporting the electronic data. If so, the method can move 504, the EDD system can setup user access to the electronic data by, for example, creating a security token, an access level, other information associated with a user, or any combination thereof. Proceeding to block 506, the EDD system can receive input from the user indicating which of the electronic data is responsive to, for example, a discovery request, and should be exported for production.

At decision node 508, the EDD system can determine whether electronic data is to be exported. If so, the method moves to block 510, and the EDD formats and exports data that is to be produced. In an example, the electronic data can be stored at the EDD system, or at a database coupled to the EDD system, in association with the case file related to the legal matter. The EDD system can format data that it obtains automatically according to a rule or according to a command obtained from the source device. The method can move to 224, illustrated in FIG. 2, and continue to the particular embodiment of the method illustrated in FIG. 7.

Figure 6:
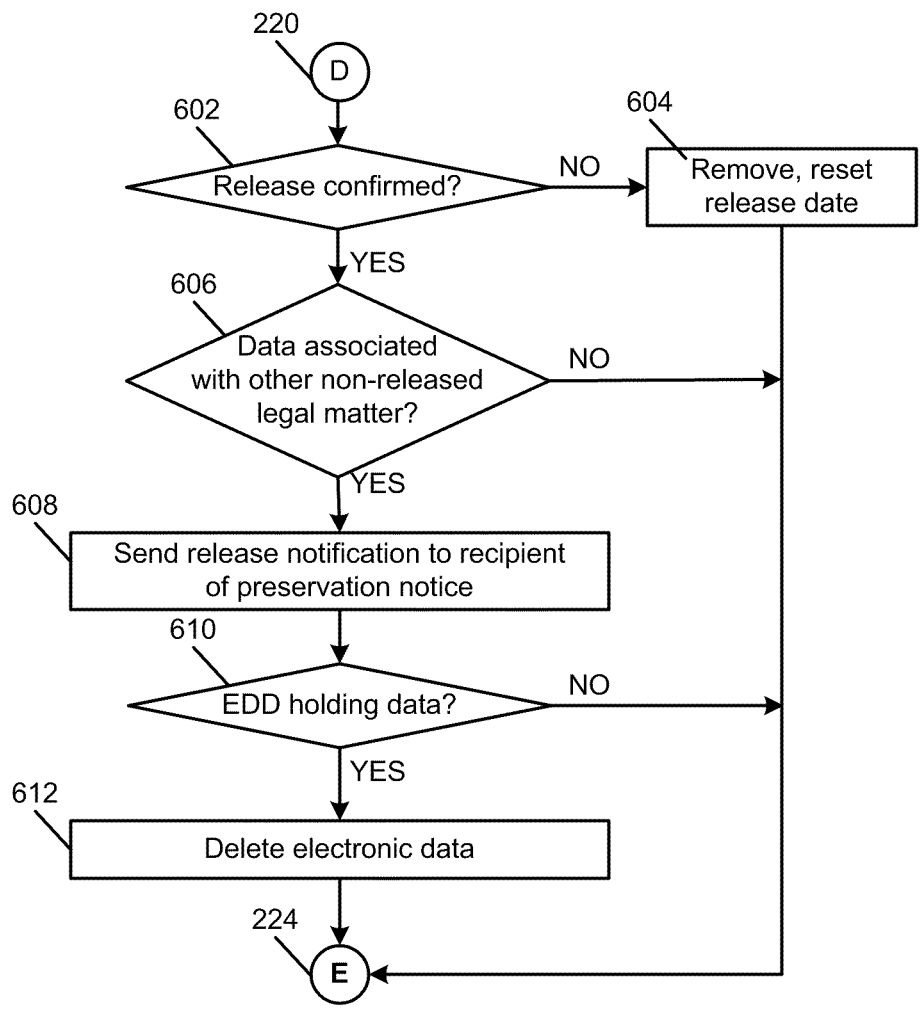

FIG. 6 continues from 220, illustrated in FIG. 2, and includes functions associated with releasing data related to a legal matter. At decision node 602, the EDD system can determine whether a release related to the electronic data has been confirmed. If not, the method can move to block 604, and a release date associated with the data can be removed, reset or a combination thereof.

If the release is confirmed, the method can proceed to decision node 606, and the EDD system can determine whether data that is to be released for the legal matter is associated with another legal matter for which data has not been released. If not, the method can continue to block 608, and a release notification can be sent to each recipient of the preservation notice sent in FIG. 3. Advancing to decision node 610, the EDD system can determine whether it is storing any of the released data. If so, the EDD system can delete the data at block 612. The method can then proceed to 224, illustrated in FIG. 2, and continue to the particular embodiment of the method illustrated in FIG. 7.

Figure 7:
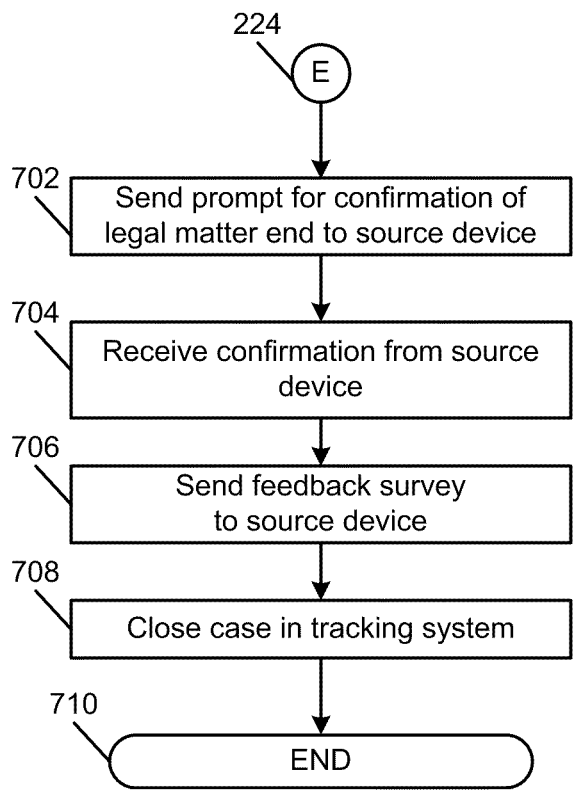

FIG. 7 continues from 224, illustrated in FIG. 2, and includes functions associated with closing a case related to a legal matter. At block 702, the EDD system can send a prompt to the source device to confirm that the legal matter has ended. Moving to block 704, the EDD system can receive a confirmation from the source device. Proceeding to block 706, the EDD system can send a feedback survey to the source device and can close the case file associated with the legal matter at block 708. The method terminates at 710.

FIG. 8 illustrates a portion 800 of an embodiment of an EDD GUI 800. The GUI can allow a user to enter case detail information 802, custodian information 804, preservation request information 806, release information 808, other information or any combination thereof. FIG. 9 illustrates another portion 900 of the GUI. The portion 900 can include a field 902 to allow a user to identify a custodian. The portion 900 can also include an area 904 that displays names of custodians to be assigned to a case and another area 906 that displays names of custodians already assigned to the case. FIG. 10 illustrates another example portion 1000 of the GUI that allows a user to enter collection information related to a particular identified custodian. FIGS. 8-10 only illustrate examples of a few portions of an EDD GUI and are not intended to be limiting as to the scope of the particular embodiments of an EDD system described herein or as to the GUI itself. Other suitable GUIs can be used to allow users to enter relevant information to an EDD system in conjunction with implementing the systems and methods disclosed.

Figure 11:
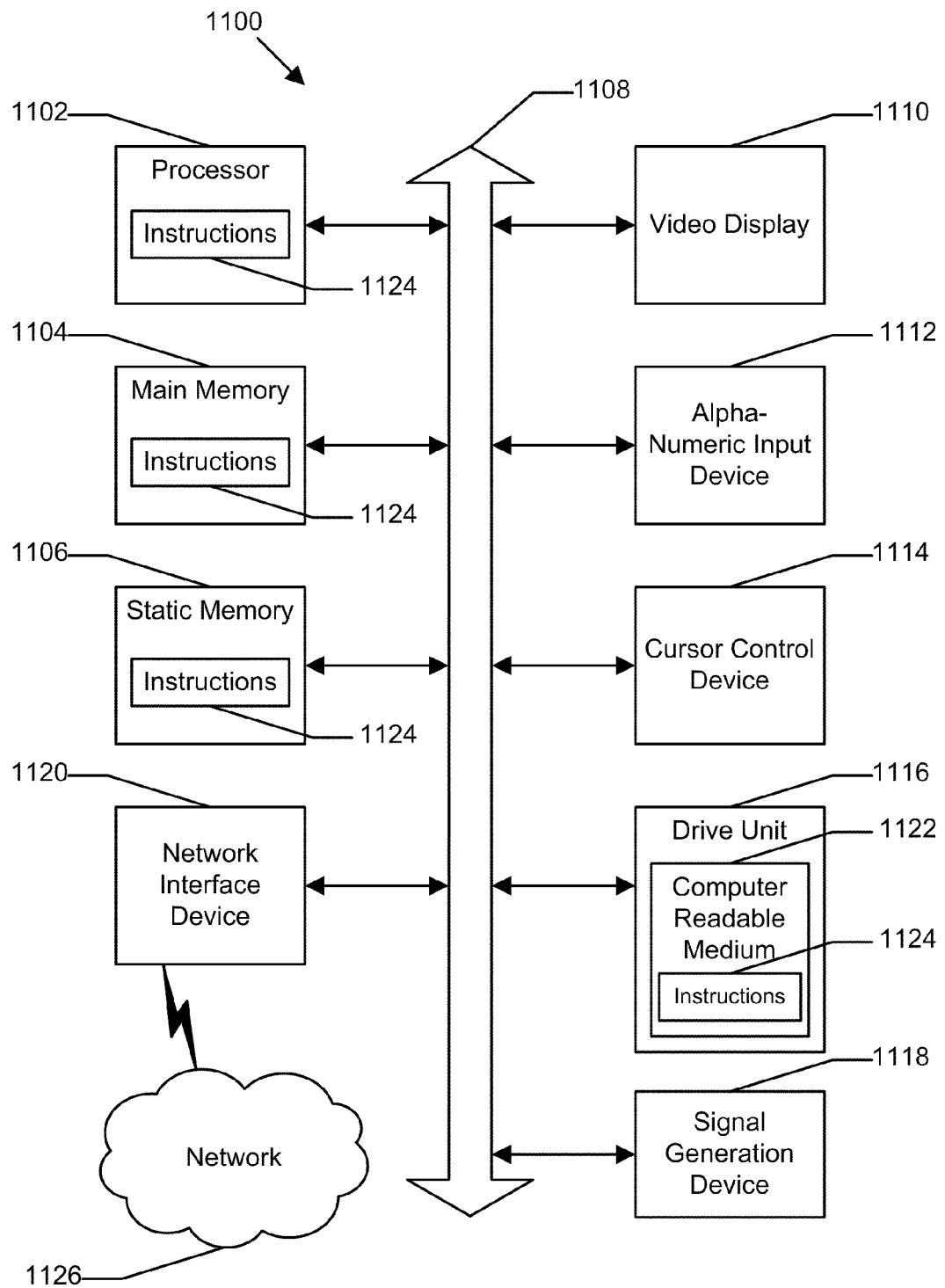
FIG. 11 is a block diagram of a particular embodiment of a general computing system.

FIG. 11 shows an illustrative embodiment of a general computer 1100 including a set of instructions that can be executed to cause the computer system to perform any one or more of the methods or computer based functions disclosed herein. The computer system 1100 may operate as a standalone device or may be connected, such as using a network, to other computer systems or peripheral devices. In an illustrative embodiment, such standalone and peripheral devices can include, for example, a server, a database, an EDD system, a phone system, a source device, another network element, or any combination thereof, as illustrated in FIG. 1.

In a networked deployment, the computer system 1100 may operate in the capacity of a server or as a client user computer in a server-client user network environment, or as a peer computer system in a peer-to-peer (or distributed) network environment. The computer system 1100 can also be implemented as or incorporated into various devices, including, for instance, source devices adapted to send a new case request, such as a personal computer (PC), a tablet PC, a personal digital assistant (PDA), a mobile device, a palmtop computer, a laptop computer, a desktop computer, a communications device, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media. The network interface device 1120 can provide connectivity to a network 1126, such as a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

In the description above, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
    receiving, at an online electronic data discovery system, a request to preserve data related to a legal matter and an identification of a custodian associated with the data, wherein the request is received from a source device via a private network, wherein the custodian is identified by a job function of the custodian, wherein the request is received with a first input that includes a release criterion for discarding the data related to the legal matter, wherein the release criterion includes a statute of limitations date and an event for triggering a release of the data related to the legal matter, wherein the first input further includes a preservation criterion that includes a document subject type that identifies the data related to the legal matter that is to be preserved;
    automatically accessing a directory via the private network in response to receiving the request;
    receiving information from the directory indicating whether the identified custodian is accessible via the private network;
    sending a preservation notice to the identified custodian when the information received from the directory indicates that the custodian is accessible via the private network, wherein the preservation notice indicates that the data related to the legal matter is not to be discarded; and
    sending the preservation notice to a custodian other than the identified custodian when the information received from the directory indicates that the identified custodian is not accessible, wherein the identified custodian is not accessible when the job function of the custodian is determined to have changed.

2. The method of claim 1, further comprising, before sending the preservation notice to another custodian:
    sending information to the source device indicating that the identified custodian is not accessible via the private network; and
    receiving a second input identifying the other custodian from the source device.

3. The method of claim 1, further comprising automatically sending information to the source device suggesting the other custodian based on information received from the directory.

4. The method of claim 1, further comprising determining whether a confirmation is received in response to the preservation notice before a particular time and sending a reminder to the identified custodian or the other custodian when the confirmation is not received before the particular time.

5. The method of claim 1, further comprising collecting electronic data from the identified custodian or the other custodian and storing the electronic data at a data store.

6. The method of claim 1, further comprising:
    determining that a production criterion has been satisfied; and
    exporting the electronic data from the data store to a printer, a file server, an external storage device, or any combination thereof.

7. The method of claim 1, further comprising:
    determining that the release criterion included in the first input received with the request has been satisfied, wherein the release criterion is satisfied if the statute of limitations date is satisfied or the event for triggering the release of the data related to the legal matter occurs; and
    sending a release notice to the identified custodian or the other custodian, the release notice indicating that data related to the legal matter may be discarded.

8. The method of claim 7, further comprising deleting electronic data related to the legal matter at the electronic data discovery system or at a data store communicating with the electronic data discovery system.

9. The method of claim 7, further comprising:
    determining whether the data related to the legal matter is also related to another legal matter for which data has not been released; and
    not sending the release notice when the data related to the legal matter is also related to the other legal matter.

10. The method of claim 1, further comprising using search criteria received from the source device to search electronic data in possession of the identified custodian or the other custodian and collecting electronic data matching the search criteria.

11. The method of claim 1, further comprising filtering collected electronic data using culling criteria received from the source device.

12. The method of claim 1, wherein the receiving from the source device comprises receiving at the online electronic data discovery system from a user operating the source device via the private network the request to preserve the data related to the legal matter and the identification of the custodian associated with the data.

13. The method of claim 1, wherein the accessing the directory is accessing a device other than the source device.

14. A system, comprising:
    a memory that stores instructions;

a processor that executes the instructions to perform operations, the operations comprising:

receiving at an online electronic data discovery system a request to preserve data related to a legal matter, wherein the request is received from a source device via a private network, wherein the request is received with input that includes a release criterion for discarding the data related to the legal matter, wherein the release criterion includes a statute of limitations date and an event for triggering a release of the data related to the legal matter, wherein the input further includes a preservation criterion that includes a document subject type that identifies the data related to the legal matter that is to be preserved;

automatically identifying, based on the input associated with the request, a portion of the data and a custodian associated with the portion of the data, wherein the custodian is identified by a job function of the custodian;

automatically accessing a directory associated with a phone system via the private network in response to receiving the request and receiving information from the directory indicating whether the identified custodian is accessible via the private network;

sending a preservation notice to the identified custodian when the information received from the directory indicates that the custodian is accessible via the private network, wherein the preservation notice indicates that the data related to the legal matter is not to be discarded; and sending the preservation notice to a custodian other than the identified custodian when the information received from the directory indicates that the identified custodian is not accessible, wherein the identified custodian is not accessible when the job function of the custodian is determined to have changed.

15. The system of claim 14, wherein the operations further comprise:

receiving a message from the identified custodian or the other custodian, the message identifying an additional custodian associated with data associated with the legal matter; and sending the preservation notice to the additional custodian.

16. The system of claim 15, wherein the operations further comprise, before sending the preservation notice to the additional custodian:

sending another message to the source device identifying the additional custodian; and receiving an approval from the source device to send the preservation notice to the additional custodian.

17. The system of claim 15, wherein the preservation notice indicates that the preservation notice is not to be forwarded by a recipient.

18. A non-transitory computer-readable medium including processor-readable instructions that are executable by a processor to perform a method, the method comprising:

receiving, at an online electronic data discovery system, a request to preserve data related to a legal matter and an identification of a custodian associated with the data, wherein the request is received from a user at a source device via private network, wherein the custodian is identified by a job function of the custodian, wherein the request is received with an input that includes a release criterion for discarding the data related to the legal matter, wherein the release criterion includes a statute of limitations date and an event for triggering a release of the data related to the legal matter, wherein the input further includes a preservation criterion that includes a document subject type that identifies the data related to the legal matter that is to be preserved;

automatically accessing a directory via the private network and receiving information from the directory indicating that the identified custodian is not accessible via the private network, wherein the identified custodian is not accessible when the job function of the custodian is determined to have changed;

automatically selecting a custodian other than the identified custodian to receive a notice to preserve the data in response to the information from the directory; and sending a request for confirmation of the selection of the custodian other than the identified custodian to the user at the source device.

19. The non-transitory computer-readable medium of claim 18, wherein the directory comprises a directory associated with a company phone system.

20. The non-transitory computer-readable medium of claim 18, wherein the method further comprises saving the preservation notice, a submission date of the preservation notice, and a closing date of the preservation notice in a data store communicating with the electronic data discovery system.

* * * * *